(12) United States Patent
Hardwicke et al.

(10) Patent No.: US 7,931,759 B2
(45) Date of Patent: Apr. 26, 2011

(54) METAL ALLOY COMPOSITIONS AND ARTICLES COMPRISING THE SAME

(75) Inventors: Canan Uslu Hardwicke, Simpsonville, SC (US); Ganjiang Feng, Greenville, SC (US); Melvin Robert Jackson, Corea, ME (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 11/621,309

(22) Filed: Jan. 9, 2007

(65) Prior Publication Data

US 2008/0163785 A1      Jul. 10, 2008

(51) Int. Cl.
| | |
|---|---|
| C22C 19/05 | (2006.01) |
| C23C 30/00 | (2006.01) |
| B32B 15/01 | (2006.01) |
| B32B 15/18 | (2006.01) |
| B32B 15/00 | (2006.01) |
| B22F 7/00 | (2006.01) |

(52) U.S. Cl. .......... 148/428; 148/22; 148/410; 428/680; 428/656; 428/678; 106/1.05

(58) Field of Classification Search .................. 148/428, 148/410, 442; 428/680, 633, 469, 472, 656, 428/629, 678; 106/1.05
See application file for complete search history.

(56) References Cited

U.S. PATENT DOCUMENTS

| | | | |
|---|---|---|---|
| 3,918,139 | A | 11/1975 | Felten |
| 4,034,142 | A | 7/1977 | Hecht |
| 4,346,137 | A | 8/1982 | Hecht |
| 4,419,416 | A | 12/1983 | Gupta et al. |
| 4,585,481 | A | 4/1986 | Gupta et al. |
| 4,861,618 | A | 8/1989 | Vine et al. |
| 6,221,181 | B1 | 4/2001 | Bossmann et al. |
| 6,416,882 | B1 | 7/2002 | Beele et al. |
| 6,979,498 | B2 | 12/2005 | Darolia et al. |
| 2005/0164026 | A1 | 7/2005 | Quadakkers et al. |
| 2005/0214563 | A1 | 9/2005 | Feng et al. |
| 2006/0046091 | A1 | 3/2006 | Madhava |
| 2006/0222776 | A1 | 10/2006 | Madhava |

FOREIGN PATENT DOCUMENTS

| | | | |
|---|---|---|---|
| EP | 0652299 | | 5/1995 |
| EP | 0718419 | | 6/1996 |
| EP | 1111091 | | 6/2001 |
| EP | 1327702 | | 7/2003 |
| EP | 1361291 | | 11/2003 |
| EP | 1380672 | * | 1/2004 ........................ 28/2 |
| EP | 1380672 | A | 1/2004 |
| WO | 2005056852 | A2 | 6/2005 |
| WO | 2006067189 | A | 6/2006 |

OTHER PUBLICATIONS

European Search Report. Reference 214856/13046. Application No. 08250031.5-2122. Mailed Apr. 25, 2008. 8 pages.
WO 9102108 (corresponding PCT for EP 0486489), published Feb. 21, 1991, Abstract Only, 1 page.

* cited by examiner

Primary Examiner — Ling-Siu Choi
Assistant Examiner — Monique Peets
(74) Attorney, Agent, or Firm — Cantor Colburn LLP

(57) ABSTRACT

Improved compositions are described for the protection of gas turbine parts at elevated temperatures. The compositions are of the MCrAlY type, wherein M is Nickel, or Nickel in combination with cobalt and/or iron. The compositions further comprise a lanthanide, a group 4 metal selected from hafnium, zirconium, titanium, or a combination of these, and optionally, a group 14 element selected from silicon and/or germanium. The combination results in improved Al retention properties. Also disclosed herein are articles comprising the coatings.

18 Claims, 2 Drawing Sheets

METAL ALLOY COMPOSITIONS AND ARTICLES COMPRISING THE SAME

BACKGROUND OF THE INVENTION

This disclosure relates to a metal alloy composition that can be used as an overlay coating and/or bond coats in gas turbine engines.

Protection of metal alloy surfaces used in high temperature regions of gas turbine engines can be affected by the use of overlay coatings, and/or thermal barrier coatings (TBC's) deposited over bond coats. Overlay coatings and TBC's protect the underlying metal alloy substrate against heat and the corrosive environment of the hot gases. Gas turbine components that are typically coated with TBC's and overlay coatings include both moving and stationary parts such as turbine blades and vanes, gas mixing conduits, turbine shrouds, buckets, nozzles, combustion liners and deflectors, and other components subject to the conditions of high heat and corrosive gases. TBC's and overlay coatings typically comprise the external portion or surface of these components. The presence of the TBC and/or overlay coating provides a heat reducing barrier between the hot combustion gases and the metal alloy substrate, and can prevent, mitigate, or reduce potential heat and/or oxidation induced damage to the substrate.

The most effective coatings for protecting metal alloy turbine components are those known as MCrAlY coatings, wherein M is typically cobalt, nickel, iron, or combinations thereof. These coatings are useful as both overlay coatings or bond coats.

The aluminum present in the metal alloy composition can diffuse into the metal alloy substrate, which is undesirable. Such diffusion reduces the aluminum content in the metal alloy composition, aluminum being necessary to allow for the formation of a protective aluminum oxide surface. Cross diffusion of other elements in the surface coating and the substrate, such as nickel, cobalt, or chromium, occurs and is also undesirable.

The metal alloy composition is useful for, among others, bond coats between the TBC and the metal alloy substrate. TBC's are susceptible to delamination and spalling during gas turbine operation. The spalling and delamination can be caused by several factors, including the presence of thermally grown oxide layers (TGO's) that can form at the interface between the TBC and the bond coat interface. TGO formation can be the result of oxidation of the aluminum of the bond coat, and can be promoted by the diffusion of aluminum from the bond coat into the TBC, causing a change in the structure of the bond coat which can further cause a strain mismatch between the TBC and the bond coat. After the TBC spalls, the oxidation of the system is protected by the aluminum content in the bond coat, which forms an aluminum oxide protective layer.

There is therefore a need for metal alloy compositions with improved diffusion properties for use in bond coats and overlay coats. A bond coat with improved diffusion can desirably slow or delay the onset of spalling and delamination of TBC's.

SUMMARY OF THE INVENTION

The above deficiencies in the art are alleviated by, in an embodiment, a composition, comprising a MCrAlY composition; a lanthanide selected from the group consisting of lanthanum, cerium, praseodymium, neodymium, promethium, samarium, europium, gadolinium, terbium, dysprosium, holmium, erbium, thulium, ytterbium, lutetium, and a combination comprising at least one of the foregoing lanthanides; and a Group 4 metal selected from the group consisting of hafnium, zirconium, titanium, and combinations thereof, wherein M is nickel, or a combination of nickel and a metal selected from the group consisting of cobalt, iron, and a combination of cobalt and iron, Cr is chromium, Al is aluminum, and Y is yttrium. In another embodiment, the composition further comprises a Group 14 element selected from the group consisting of silicon, germanium, and a combination thereof.

In another embodiment, a composition comprises about 16 to about 50 weight percent cobalt, about 20 to about 35 weight percent nickel, about 15 to about 25 weight percent chromium, about 7 to about 15 weight percent aluminum, about 0.1 to about 1 weight percent yttrium, about 0.2 to about 1 weight percent hafnium, about 0.5 to about 1 weight percent gadolinium, and about 0.5 to about 4 weight percent silicon; wherein the weight percentages are based on the total weight of the composition.

In another embodiment, an article comprises the composition described above.

DETAILED DESCRIPTION OF THE INVENTION

Figure 1:
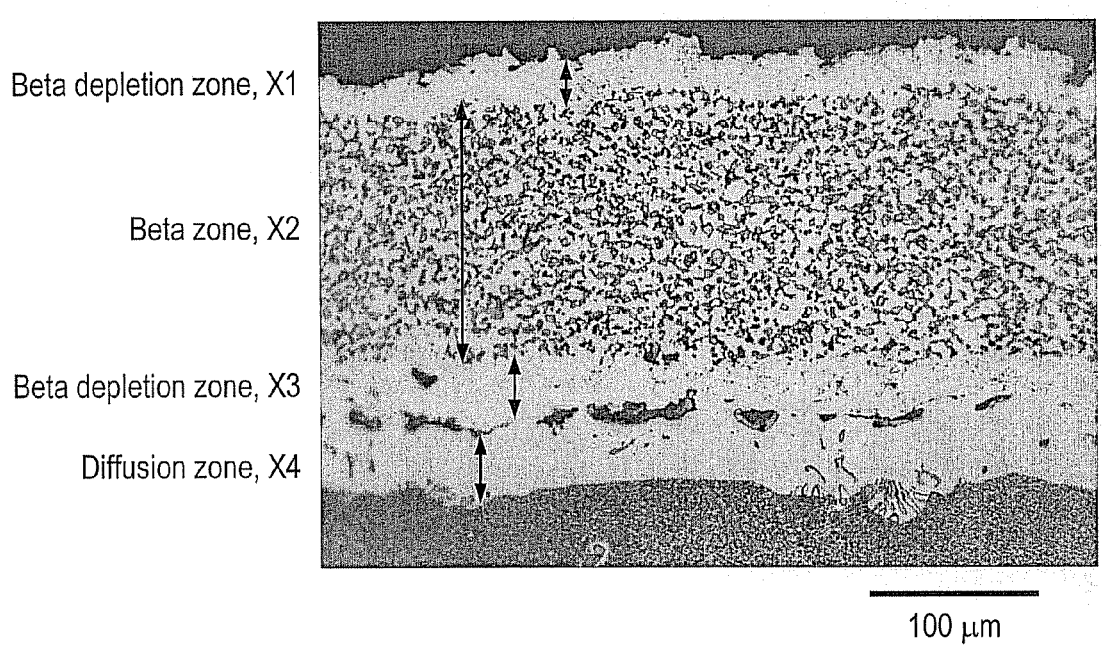
FIG. 1 shows a beta-gamma, two-phase microstructure of a MCrAlY coating.

Surprisingly, it has been found that adding about 0.1 to about 5 weight percent of a lanthanide to a composition comprising a MCrAlY composition, and about 0.05 to about 5 weight percent of a Group 4 metal, specifically hafnium, zirconium, titanium, or a combination of these, results in compositions having slow diffusivity of the aluminum component. The composition can further include about 0.1 to about 8 weight percent a Group 14 element, specifically silicon and/or germanium, wherein the presence can further slow down the diffusion of aluminum. Such compositions are advantageous to use as bond coats and overlay coatings.

The composition disclosed herein comprises a MCrAlY composition; a Group 4 metal selected from hafnium, zirconium, titanium, or a combination of these, a lanthanide, and a Group 14 element, specifically silicon and/or germanium. As used herein, "MCrAlY" refers to compositions comprising chromium, aluminum, yttrium, and a metal M selected from nickel, or a combination of nickel with cobalt and/or iron; "lanthanide" refers to lanthanide or lanthanoid elements, which include lanthanum, cerium, praseodymium, neodymium, promethium, samarium, europium, gadolinium, terbium, dysprosium, holmium, erbium, thulium, ytterbium. Also included with the lanthanide or lanthanoid elements is lutetium.

The metal M is selected from nickel, or a combination of nickel with cobalt and/or iron. It is present in the composition in an amount of about 10 to about 80 weight percent, specifically in an amount of about 12 to about 75 weight percent, more specifically in amount of about 14 to about 70 weight percent, even more specifically in amount of about 16 to about 65 weight percent, based on the total weight of the composition. In one embodiment, M is nickel. In another embodiment, M is a combination of nickel and cobalt. In another embodiment, M is a combination of nickel and iron. In yet another embodiment, M is a combination of nickel, iron and cobalt.

When M is nickel, the nickel is present in the composition in about 20 to about 80 weight percent, specifically about 30 to about 75 weight percent, more specifically about 40 to about 70 weight percent, based on the total weight of the composition. When M is a combination of nickel with iron and/or cobalt, the nickel is present in an amount of about 20 to about 40 weight percent, specifically about 22 to about 38 weight percent, more specifically about 25 to about 35 weight percent, based on the total weight of the composition, whereas the total cobalt and iron in the composition is about 10 to about 60 weight percent, specifically about 12 to about 53 weight percent, more specifically about 14 to about 45 weight percent, even more specifically about 16 to about 40 weight percent, based on the total weight of the composition.

The chromium is present in amount of about 5 to about 30 weight percent, specifically about 10 to about 28 weight percent, and more specifically about 15 to about 25 weight percent, based on the total weight of the composition.

The composition also comprises aluminum in an amount of about 5 to about 20 weight percent, specifically about 6 to about 18 weight percent, more specifically about 7 to about 15 weight percent, based on the total weight of the composition.

The composition comprises yttrium in an amount of about 0.05 to about 5 weight percent, specifically about 0.1 to about 2 weight percent, and more specifically about 0.1 to about 1 weight percent, based on the total weight of the composition.

The composition also comprises a Group 4 metal selected from the group consisting of hafnium, zirconium, titanium, and combinations thereof. Group 4 metals are present in the composition in an amount of about 0.05 to about 5 weight percent, specifically about 0.1 to about 3 weight percent, and more specifically about 0.1 to about 1 weight percent, based on the total weight of the composition. In a specific embodiment, the Group 4 metal used is hafnium. In another specific embodiment, the Group 4 metal used is zirconium. In yet another specific embodiment, the Group 4 metal used is titanium. In one embodiment, a combination of hafnium with zirconium and/or titanium is used. In one embodiment, the composition is substantially free of zirconium and titanium. As used herein, when a composition is referred to as being "substantially free of" a component, this means having less than 0.04 weight percent, specifically less than 0.01 weight percent, and more specifically less than 0.001 weight percent, based on the total weight of the composition, unless otherwise specified.

The composition further comprises a lanthanide. In an embodiment, the lanthanide is selected from the group consisting of lanthanum, cerium, praseodymium, neodymium, promethium, samarium, europium, gadolinium, terbium, dysprosium, holmium, erbium, thulium, ytterbium, lutetium, and a combination comprising at least one of the foregoing lanthanides. In another embodiment, the lanthanide is selected from the group consisting of lanthanum, samarium, europium, gadolinium, erbium, lutetium, and combination comprising at least one of the foregoing lanthanides. In one specific embodiment, it is advantageous to use gadolinium as the lanthanide. The lanthanide is present in the composition in an amount of about 0.1 to about 5 weight percent, specifically about 0.15 to about 4 weight percent, more specifically about 0.2 to about 3 weight percent, even more specifically about 0.25 to about 2 weight percent, and yet even more specifically about 0.3 to about 1 weight percent based on the total weight of the composition. In an embodiment, the composition comprises about 0.3 to about 1 weight percent gadolinium. In a specific embodiment, a composition comprising gadolinium is substantially free of other lanthanides.

The composition can further comprise an added amount of a Group 14 element, specifically silicon and/or germanium. When present, the silicon and/or germanium can be included in an amount of about 0.1 to about 8 weight percent, specifically about 0.2 to about 6 weight percent, more specifically about 0.4 to about 5 weight percent, even more specifically about 0.5 to about 4 weight percent, based on the total weight of the composition. In an embodiment, silicon is present in an amount of about 0.5 to about 4 weight percent, based on the weight of the composition. In another embodiment, the composition is substantially free of germanium.

It is advantageous to keep the amount of Group 14 element used within the disclosed range. If an excess of silicon is utilized, the coatings made from such a composition will lose silicon through the formation of silicides. Such loss of silicon can lead to a reduction in the life of the coating.

The composition can further comprise other metals, such as ruthenium, rhenium, platinum, palladium, and/or rhodium. If present, the other metals are each in an amount of less than about 2 weight percent, based on the total weight of the composition.

In addition, other trace components can be present in minor amounts, e.g., less than or equal to about 0.1 weight percent of the total weight of the composition, provided the presence of these components does not significantly adversely affect the desired properties of the composition. In an embodiment, the composition consists essentially of cobalt, iron, nickel, chromium, aluminum, yttrium, gadolinium, hafnium, and silicon. In another embodiment, the composition consists essentially of cobalt, nickel, chromium, aluminum, yttrium, gadolinium, hafnium, and silicon.

In one specific embodiment, a composition comprises about 16 to about 50 weight percent cobalt, about 20 to about 35 weight percent nickel, about 15 to about 25 weight percent chromium, about 7 to about 15 weight percent aluminum, about 0.1 to about 1 weight percent yttrium, about 0.2 to about 1 weight percent hafnium, about 0.3 to about 1 weight percent gadolinium, and about 0.5 to about 4 weight percent silicon, wherein the weight percentages are based on the total weight of the composition.

In another specific embodiment, a composition consists of about 20 to about 80 weight percent nickel, about 15 to about 25 weight percent chromium, about 7 to about 15 weight percent aluminum, about 0.1 to about 1 weight percent yttrium, about 0.2 to about 1 weight percent hafnium, about 0.3 to about 1 weight percent gadolinium, and about 0.5 to about 4 weight percent silicon, wherein the weight percentages are based on the total weight of the composition.

To apply the composition to a substrate, the composition can be blended in a melt phase, allowed to solidify, and the solid turned to powder form. Alternatively, powder form of each component of the composition can be used and combined by a suitable method, e.g., mixing using a powder mixer. The composition can be disposed on substrates using a method that includes, but is not limited to, thermal spraying, physical vapor deposition methods, plasma methods, electron beam methods, sputtering, slurry coating, paint spraying, direct-writing, or plating.

Where a vapor deposition method is used for deposition of the composition, single or multi-source evaporation procedures can be employed to deposit the composition on the substrate. Multi-source deposition can be used where the vapor pressures of the constituent components vary significantly. For example, due to the low vapor pressure of component metals such as hafnium, gadolinium, and the like relative to that of the other components described herein, it is advantageous to use multi source evaporation procedures wherein one or more sources contain the hafnium and/or lanthanide (e.g. gadolinium) components, and one or more sources contain the balance of the components of the composition.

In an embodiment, the composition can be disposed on a substrate using a thermal spraying process such as air plasma spraying (APS), low pressure plasma spraying (LPPS), vacuum plasma spraying (VPS), and high velocity oxy-fuel spraying (HVOF). In a specific embodiment, it is advantageous to use HVOF. Thus, a high pressure cooled combustion chamber attached to a nozzle is fed with a fuel such as, for example, kerosene, acetylene, propylene, hydrogen, and the like, and combinations thereof. Combustion produces a high temperature, high pressure flame which is forced down the nozzle, thereby increasing its velocity. The composition can be fed in powder form into the combustion chamber under high pressure, or through an inlet at the side of the nozzle. The HVOF process is advantageous, and parameters can be modified by someone skilled in the art depending on the application at hand.

The composition can be disposed on a substrate for any purpose, e.g., to form a new layer, or to repair an existing layer, wherein the layer can be an overlay coating or a bond coat, among others. The composition can be disposed on any surface of the metal substrate. It can be disposed directly on a bare surface of a substrate, or on a surface comprising a pre-disposed composition. As used herein, "bare surface" refers to a substrate surface that does not comprise a coating disposed on the surface to provide thermal or oxidation protection. As used herein, a surface comprising a "pre-disposed" composition refers to a surface comprising a coating disposed on that surface. In an advantageous embodiment, an article is repaired by applying the composition to a surface of the article comprising a pre-disposed composition.

In an embodiment, a superalloy substrate can be coated by the disclosed composition. "Superalloys", as disclosed herein, are metallic alloys intended for elevated temperature applications, i.e. temperatures of up to about 1,200° C. Superalloys are useful where chemical and mechanical stability, oxidation, and corrosion affect the useful life of an article and where significant high-temperature durability is required, such as for a component for a gas turbine. In an exemplary embodiment, a superalloy can be a MCrAlY alloy, wherein M is iron, cobalt, nickel, or a combination thereof. High Ni superalloys (where M comprises Ni) are specifically useful. Exemplary commercially available Ni-containing superalloys include, for example, those sold under the tradenames Inconel®, Nimonic®, Rene®, GTD-111®, and Udimet® alloys. Superalloys prepared by any suitable method can be used to provide a substrate for the disclosed composition. In addition, substrates fabricated from, for example cast superalloy, including polycrystalline columnar grain and single crystal substrates, can all be used as substrates for the disclosed composition, as can wrought substrates such as sheet metal components. When the disclosed composition is disposed on a superalloy substrate, a layer of the composition is formed on the surface of the substrate (coated or uncoated). The layer can be an overlay coating, a bond coat, or other coating.

It has been found that an overlay coating or bond coat continuously forms an alumina-containing layer (i.e., TGO) at the surface of the overlay coating or bond coat layer opposite the interface with the substrate and exposed to the environment, which minimizes the reaction of the environment with the superalloy substrate. The alumina-containing layer can have a thickness of a few molecules to several micrometers in thickness, and thickens with continued exposure of the overlay coating or bond coat to highly oxidizing environmental conditions. As a consequence of the formation of the alumina-containing layer by oxidation or reaction of the aluminum in the bond coat, the bond coat itself can experience a proportional change in properties in the portion of the bond coat adjacent to the thermally grown oxide (TGO). In an embodiment, the environmental conditions can include hot and/or corrosive combustion gases, such as, for example, those encountered in the high temperature and combustion regions of a gas turbine. During thermal cycling, stresses can form between the alumina and the overlay coating. Alumina is brittle relative to the overlay coating, and can in turn crack and spall off, exposing the underlying surface of the coating to the atmosphere, which then can form a new layer of alumina. Where an additional layer is disposed over a bond coat, the interlayer adhesion of the additional layer (such as a thermal barrier coating) to the bond coat and substrate is weakened, and therefore the additional layer can become susceptible to cracking and spalling as well.

The bond coats are generally covered with a thermal barrier coating (TBC). TBC's are ceramic coatings, such as yttria-stabilized zirconia, optionally doped with other metal oxides such as other lanthanides (e.g., cerium oxide, europium oxide, and the like), which reduce heat flow to the underlying metal substrate. TBC's are susceptible to delamination and spalling at elevated temperatures, due to formation of thermally grown oxide (TGO) that can form between the TBC and the bond coat. TGO growth characteristics are influenced by the diffusion of aluminum from the bond coat to the substrate, causing a phase change within the bond coat, which induces a strain mismatch between the bond coat and the TBC.

While not wishing to be bound by theory, it is believed that the continuous diffusion of aluminum out of the overlay coating and bond coat can deplete the nickel-aluminum beta phase, and that the diffused aluminum present at the environmental surface of the bond coat or overlay coating is responsible for the formation of alumina, which reduces the effectiveness of the overlay coating as both a protective barrier and adhesive layer. The MCrAlY comprise two phases when disposed on a substrate as described above, a gamma phase comprising mainly MCr, and a beta phase comprising mainly NiAl. The beta phase provides oxidation resistance to the substrate by providing Al to the surface as described above. As the coatings are used in harsh environments, the Al-containing beta phase starts to deplete beginning at the hotter region of the coating and eventually converts to gamma phase. These two phases can be detected by preparing a cross-sectional metallographic mount and quantified by image analysis techniques under an optical microscope. In an embodiment, about 24 percent to about 45 percent of the NiAl beta phase remains in an overlay coating with the modified compositions described above after testing at 1,034° C. (1,900° F.) for 2,000 hours.

Surprisingly, the addition of a lanthanide, as well as a Group 4 metal, and a Group 14 element, specifically silicon and/or germanium, effectively slows the diffusion of aluminum from the bond coat and/or overlay coating. This slow, reduced diffusion of aluminum has been found to impart superior quality to the disclosed compositions as defined by reduced incidence of cracking and/or spalling, reduced loss of beta phase from transformation to gamma phase during thermal cycling, and improved resistance to delamination of thermal barrier coatings to the bond coat. In an embodiment, the deposited composition displays improved resistance to hot corrosion when compared to a similar deposited composition substantially free of lanthanide, silicon and/or germanium, and Group 4 metals.

In an embodiment, an article comprises a substrate, and a coating comprising the composition disposed on and in at least partial contact with the substrate. In another embodiment, the coating is a bond coat or an overlay coating. In another embodiment where the coating is a bond coat, the article further comprises a thermal barrier coating deposited on a surface of the bond coat opposite the substrate.

The composition can be used, in an embodiment, as bond coats for use with TBC's or as overlay coatings in a wide variety of turbine engine parts and components that are formed from metal or metal-ceramic composite substrates comprising a variety of metals and metal alloys, including superalloys, particularly those operated at or exposed to high temperatures, and especially those articles used at higher temperatures that occur during gas turbine engine operation. These turbine engine parts and components can include turbine airfoils such as blades and vanes, turbine shrouds, turbine nozzles, combustor components such as liners and deflectors, augmentor hardware of gas turbine engines, and the like. The disclosed composition can cover all or a portion of the metal substrate.

The invention is further illustrated by the following examples and comparative examples, the disclosure of which are exemplary and should not be considered as limiting thereto.

EXAMPLES

The following examples illustrate the improved properties obtained when the disclosed composition is used as overlay coats. Examples 1, 2, and 2 are inventive, while example 4 is comparative.

Disk specimens of 3.18 millimeters (0.125 inches) thickness and 25.4 millimeters (1 inch) in diameter were machined from a GTD-111® (available from General Electric Co.) casting slab. The specimens have a nominal composition of 14 weight percent (wt %) chromium, 9 wt % cobalt, 3 wt % aluminum, 4.9 wt % titanium, 3 wt % tantalum, 3.7 wt % tungsten, 1.5 wt % molybdenum, and 60.9 wt % nickel, based on the total weight of the specimens.

Three different overlay coats, each having a different composition, were disposed on individual specimens using high velocity oxy-fuel flame (HVOF) process to a thickness of about 0.25 millimeters (0.01 inches). The coated specimens were tested at about 1,034° C. (1,900° F.) and about 1,093° C. (2,000° F.) in an air furnace for up to 2,000 hours.

Table 1 illustrates the different components of Examples 1-3. All component amounts are reported in weight percent, based on the total weight of the composition.

TABLE 1

| Component | Example 1 | Example 2 | Example 3 | Comparative Example 4 |
|---|---|---|---|---|
| Cobalt (wt %) | 32.3 | 34.8 | 32.6 | 35.7 |
| Nickel (wt %) | 32.0 | 32.0 | 32.0 | 32.0 |
| Chromium (wt %) | 22.0 | 22.0 | 22.0 | 22.0 |
| Aluminum (wt %) | 10.0 | 10.0 | 10.0 | 10.0 |
| Yttrium (wt %) | 0.3 | 0.3 | 0.3 | 0.3 |
| Silicon (wt %) | 2.5 | — | 2.5 | — |
| Hafnium (wt %) | 0.3 | 0.3 | 0.3 | — |
| Gadolinium (wt %) | 0.6 | 0.6 | 0.3 | — |

Comparative Example 4 is the baseline composition, with no Group 4 metals, Group 14 elements, or lanthanides added.

Example 2 comprises gadolinium as the lanthanide, hafnium as the Group 4 metal, but no silicon or germanium. Examples 1 and 2 each include the same amounts of silicon and hafnium, but a variable amount of the lanthanide gadolinium. Comparative Example 4 is free of lanthanide, Group 4 metal, and Group 14 elements.

Figure 2A:
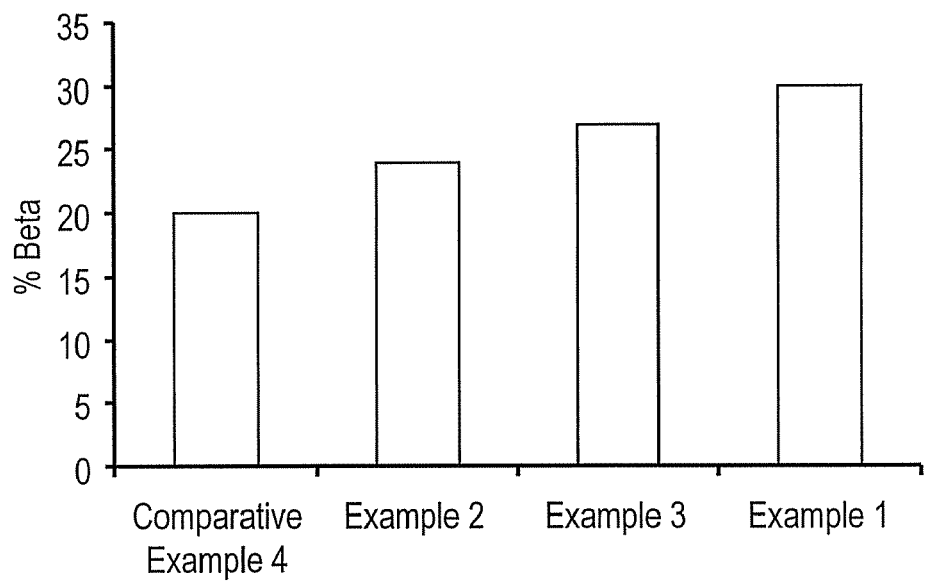
FIGS. 2a and 2b are comparisons of resulting bond coats of Examples 1-3, and Comparative Example 4.
Figure 2B:
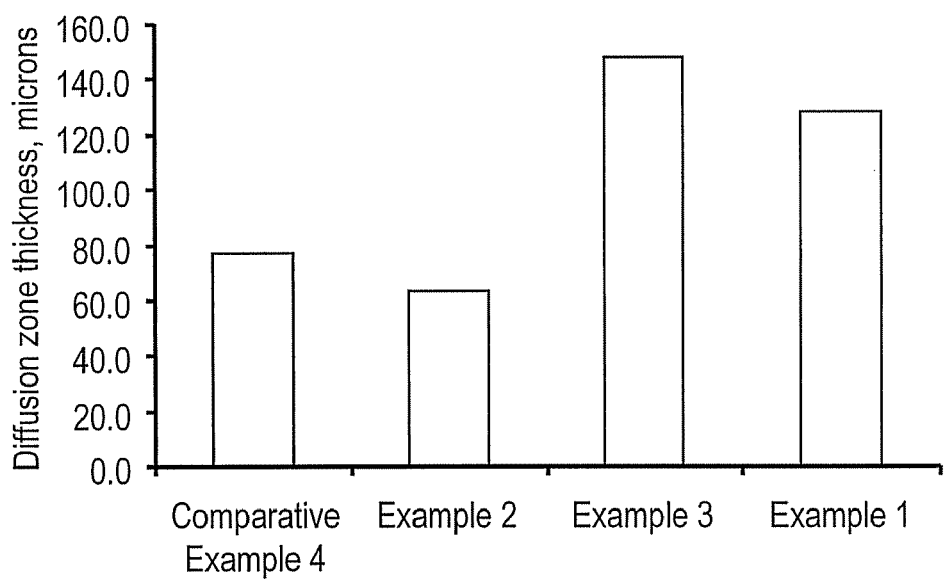

Evaluation of NiAl beta layer and interdiffusion zone thicknesses. Overlay coating layers were prepared using Example 1, Example 2, Example 3, and Comparative Example 4 and coated to a thickness of about 0.25 millimeters (0.01 inches). Cross-sectional optical metallography was conducted to determine the percentage of the NiAl beta phase remaining in the layer X2 in FIG. 1 using image analysis and is provided in FIG. 2a. The interdiffusion layer thickness (X4 in FIG. 1) for the samples after processing in an air furnace as described above were also determined and results are provided in FIG. 2b.

It can be seen from FIG. 2 that coatings having hafnium, and gadolinium (Examples 1-3) have a lower loss of the percentage of NiAl beta phase and provide superior oxidation life compared to the coating with no silicon, hafnium, or gadolinium (Comparative Example 4). Examples 1 and 2 also show that the addition of gadolinium minimizes the substrate diffusion zone and also improves the oxidation resistance. While not wishing to be bound by theory, it is believed that gadolinium in combination with hafnium, and with silicon, slow aluminum diffusion, which results in a higher amount of nickel-aluminum beta phase retention in the bond coat, and a decreased rate of nickel-aluminum beta phase to gamma phase transformation. This can provide coatings (e.g., bond coats, overlay coatings) with an improved useful lifetime The term "bond coat", as used herein, is a metallic layer deposited on a substrate prior to the deposition of a coating, e.g. thermal barrier coating (TBC).

The term "thermal barrier coating" also abbreviated as "TBC", as used herein, refers to ceramic coatings that are capable of reducing heat flow to the underlying metal substrate of the article, i.e., forming a thermal barrier.

The terms "to deposit", "depositing", "deposited", "to apply", "applied", "disposed", "disposed on", and the like as used to describe forming a layer on a substrate or other layer, mean that the layer is on and in at least partial contact with the substrate or other layer.

The singular forms "a," "an," and "the" include plural referents unless the context clearly dictates otherwise.

The endpoints of all ranges reciting the same characteristic are combinable and inclusive of the recited endpoint.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

We claim:

1. A composition, comprising a mixture of:
    a MCrAlY composition;
    a lanthanide selected from the group consisting of lanthanum, cerium, praseodymium, neodymium, promethium, samarium, europium, gadolinium, terbium, dysprosium, holmium, erbium, thulium, ytterbium, lutetium, and a combination comprising at least one of the foregoing lanthanides; and
    a Group 4 metal selected from the group consisting of hafnium, zirconium, titanium, and combinations thereof;
    wherein M is nickel, or a combination of nickel and a metal selected from the group consisting of cobalt, iron, and a combination of cobalt and iron, Cr is chromium, Al is aluminum, and Y is yttrium, wherein the amount of yttrium is about 0.1 to about 5 weight percent, based on the total weight of the composition, wherein the amount of the lanthanide is about 0.2 to about 5 weight percent, based on the total weight of the composition, wherein the amount of the Group 4 metal is about 0.3 to about 5 weight percent, based on the total weight of the composition, and wherein the combined amount of yttrium, lanthanide, and Group 4 metal is about 0.6 to about 15 wt %, based on the total weight of the composition.

2. The composition of claim 1 further comprising a Group 14 element selected from the group consisting of silicon, germanium, and a combination thereof.

3. The composition of claim 1, wherein the amount of M is about 10 to about 80 weight percent, based on the total weight of the composition.

4. The composition of claim 1, wherein, when M is nickel, the amount of nickel is about 20 to about 80 weight percent, based on the total weight of the composition; and further wherein, when M is a combination of nickel with iron, cobalt, or iron and cobalt, the amount of nickel is about 20 to about 40 weight percent, and the total amount of cobalt and iron is about 10 to about 60 weight percent, based on the total weight of the composition.

5. The composition of claim 1, wherein the amount of chromium is about 5 to about 30 weight percent, based on the total weight of the composition.

6. The composition of claim 1, wherein the amount of aluminum is about 5 to about 20 weight percent, based on the total weight of the composition.

7. The composition of claim 2, wherein the amount of the Group 14 element is about 0.1 to about 8 weight percent, based on the total weight of the composition.

8. The composition of claim 1, wherein the lanthanide is gadolinium.

9. The composition of claim 1, wherein the Group 4 metal is hafnium.

10. The composition of claim 1, wherein the Group 4 metal is titanium.

11. The composition of claim 2, wherein the Group 14 element is silicon.

12. The composition of claim 1, further comprising less than about 2 weight percent of each of ruthenium, rhenium, platinum, palladium, and/or rhodium.

13. A composition, comprising a mixture of:
about 16 to about 50 weight percent cobalt,
about 20 to about 35 weight percent nickel,
about 15 to about 25 weight percent chromium,
about 7 to about 15 weight percent aluminum,
about 0.1 to about 1 weight percent yttrium,
about 0.2 to about 1 weight percent hafnium,
about 0.5 to about 1 weight percent gadolinium, and
about 0.5 to about 4 weight percent silicon;
wherein the weight percentages are based on the total weight of the composition, and
wherein the combined amount of yttrium, gadolinium, and hafnium is about 0.8 to about 3 wt %, based on the total weight of the composition.

14. An article comprising the composition of claim 1, wherein the composition is disposed on a surface of the article.

15. The article of claim 14, wherein the composition is disposed on a bare surface of the article, or on a surface comprising a pre-disposed composition.

16. The article of claim 14, wherein the article has improved resistance to oxidation when compared to an otherwise identical article comprising a composition that is substantially free of palladium, platinum, rhodium, Group 4 metals, silicon, and germanium.

17. The article of claim 14, wherein the article is a gas turbine component.

18. A layer comprising the composition of claim 1.

* * * * *